Oct. 16, 1962 T. E. EINSELE 3,059,226
CONTROL CHAIN
Filed Aug. 6, 1957 3 Sheets-Sheet 1
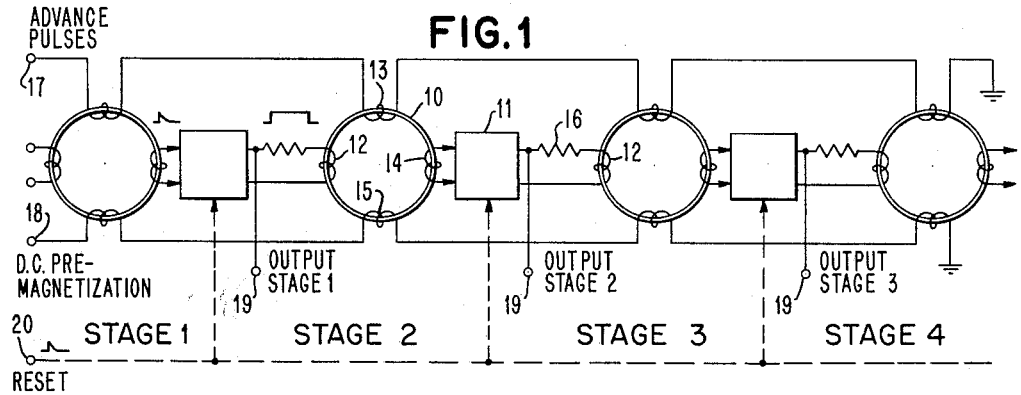
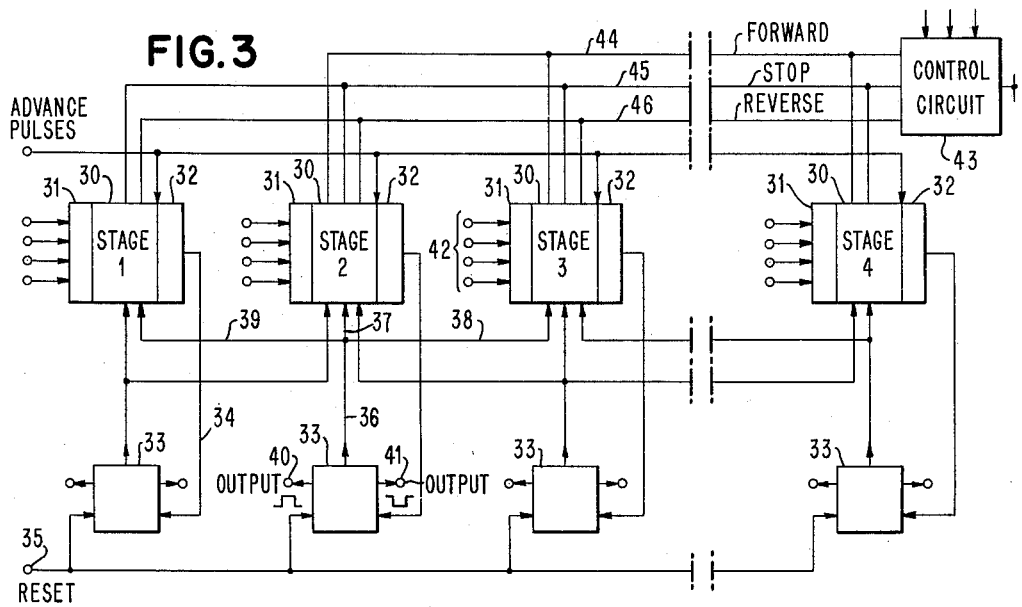
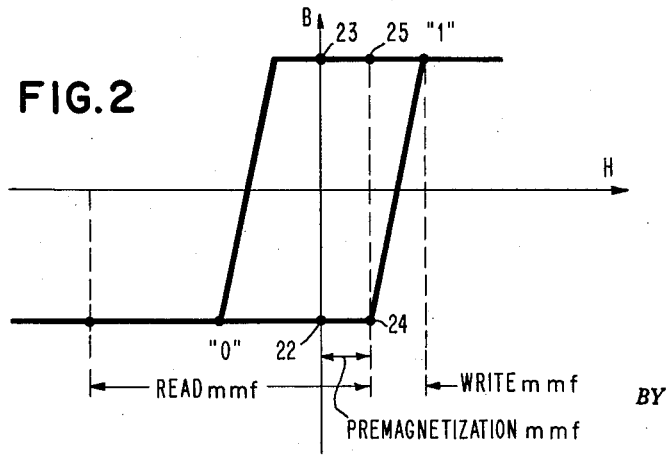
INVENTOR.
THEODOR E. EINSELE
BY
Paul M Enlow
ATTORNEY

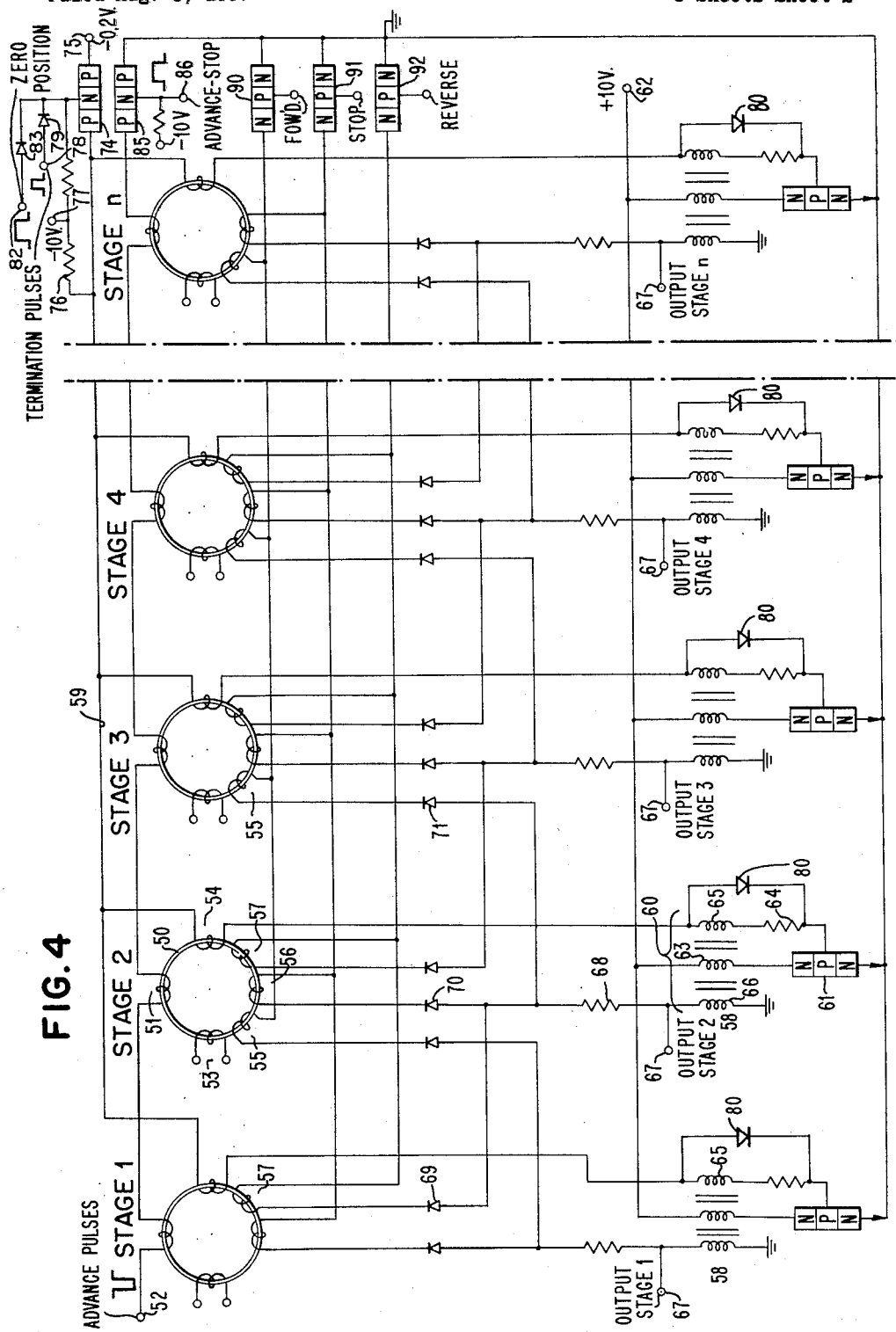

United States Patent Office 3,059,226
Patented Oct. 16, 1962

3,059,226
CONTROL CHAIN
Theodor E. Einsele, Sindelfingen, Baden-Wurttemberg, Germany, assignor to International Business Machines Corporation, New York, N.Y., a corporation of New York
Filed Aug. 6, 1957, Ser. No. 676,682
Claims priority, application Germany Aug. 16, 1956
5 Claims. (Cl. 340—174)

This invention relates to pulse delay and transfer devices and has particular relation to a control chain for shifting, delaying and storing electrical representations in a plurality of serially coupled magnetic storage devices.

In the prior art, inflexible control chains having a fixed and predetermined cycle and step sequence have been utilized in conjunction with data processing machines to control the performance of elementary steps effected by the machine. These control chains, often referred to as timing rings, generally comprise a plurality of bistable devices operable in a manner similar to the operation of a shifting register. Due to insufficient power output of each stage, it has generally been the practice to provide amplifying stages for applying the output signals from the chain to other control circuitry. In addition, further amplifier stages have frequently been required between stages to provide sufficient power to drive the next stage of the chain. Due to the insufficient power output of the stages of these chains, all logical operations generally had to be carried out externally to the chain.

Accordingly, a feature of the present invention is to provide a novel control chain comprising a plurality of magnetic storage elements which are intercoupled by active pulse producing coupling elements. When a stage of a chain produces an output pulse, the associated coupling element is energized to thereafter simultaneously apply a pulse to the next subsequent stage and also to an output terminal for use in energizing further circuitry. The invention includes novel circuitry permitting a single active coupling element to energize the subsequent, preceding or associated stage of the chain, depending on whether forward, reverse, or interruption of the advancement is selected. The novel arrangement further includes circuitry for interrupting advancement of the chain while permitting read out and rewrite in each stage, and additional circuitry permitting interruption of advancement without reading out each stage thereof. Logical operations may be performed at the input of any stage of the chain thereby providing flexibility with respect to the start and termination of the operation of the chain. Hence, flexible control is afforded with respect to the direction of advance and the start and termination of the elementary steps effected by a machine, such as a data processing machine under control of the novel control chain.

Accordingly, it is a principal object of the invention to provide a novel magnetic delay chain having flexible operation in starting, terminating and controlling the direction of advance of the stages of the chain.

Another object is to provide a magnetic shift register comprising a plurality of stages, each stage of which includes inputs for performing logical operations directly in the chain.

A further object is to provide a magnetic delay chain having a plurality of stages wherein the stages are intercoupled by active coupling elements each having the ability to supply an output pulse sufficient to drive further circuitry.

Another object is to provide a control chain comprising a plurality of magnetic cores intercoupled by transistor blocking oscillators which simultaneously provide an output pulse and the power required to drive another stage of the chain in response to a first stage being read out.

It is also an object to provide a control chain having transistor blocking oscillators as coupling elements between the stages of the chain wherein said blocking oscillators produce a pulse having a duration which is longer than the desired output pulse and which is terminated by an independently timed pulse.

A further object is to provide a control chain comprising a plurality of magnetic storage devices intercoupled by active pulse producing coupling elements and further including a plurality of stages for directing the output of a coupling element to the subsequent, succeeding or associated magnetic storage device thereby affording forward, reverse or standstill type of operation.

An additional object is to provide a novel shifting register employing magnetic cores as the storage elements thereof and including active pulse producing coupling elements intercoupling the cores in a manner to provide flexibility of operation in starting, stopping and the direction of shift of the register.

Other objects of the invention will be pointed out in the following description and claims and illustrated in the accompanying drawings, which disclose, by way of example, the principle of the invention and the best mode, which has been contemplated, of applying that principle.

In the drawings:

FIG. 1 illustrates a simple embodiment of the invention providing operation in the forward direction;

FIG. 2 illustrates a hysteresis loop of a magnetic core;

FIG. 3 is a block diagram of the invention illustrating the forward, reverse and standstill operation of the invention;

FIG. 4 illustrates a circuit diagram of the novel control chain having blocking oscillators as the coupling elements.

*Introduction*

Figure 5:
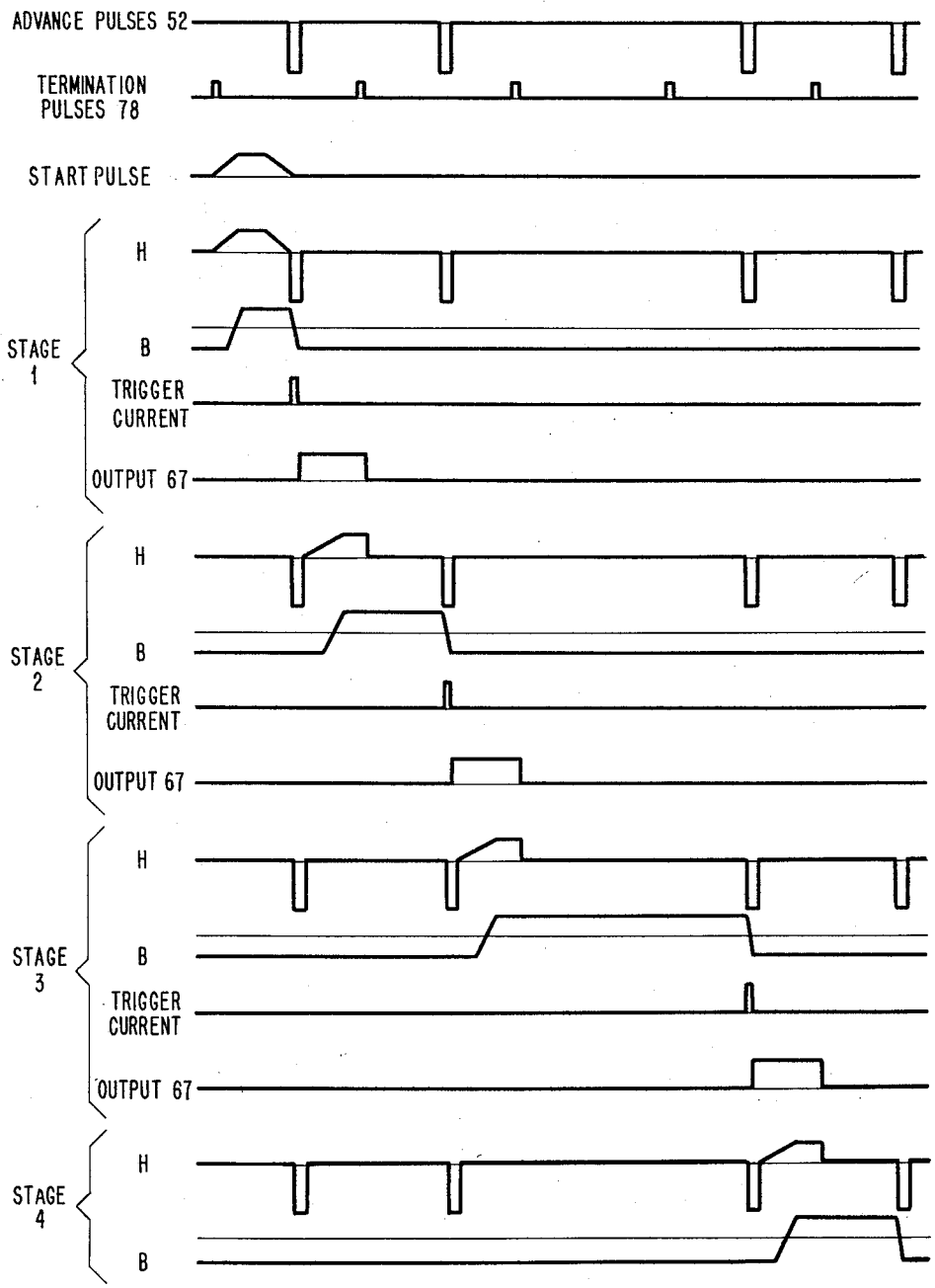
FIG. 5 is a timing chart illustrating idealized waveforms occurring in the circuit of FIG. 4.

The novel control chain includes a plurality of magnetic cores intercoupled to operate in a serial manner similar to the operation of a shifting register. The invention may be utilized as a control chain, i.e., a timing device, or as a shifting register. A pulse forming coupling element is provided which intercouples each stage of the chain to the succeeding stage, the preceding stage and to the stage itself so that a pulse read out from a stage may be advanced to the next succeeding stage, to the preceding stage, or may be rewritten in the same stage. A plurality of transistor switching elements are provided which control the forward, reverse or stop type of operation of the chain. With respect to stopping the advance of the chain, a first transistor switch permits the contents of each core to be read out and rewritten in the same cores without advancing the chain. A second transistor switch permits the advancement of the chain to be interrupted without reading out the contents of each core, i.e., without disturbing the status of each core. An additional transistor switching element is utilized to terminate each output pulse produced thereby eliminating effects of the individual transistors and other circuit elements. The latter transistor switching element also permits the read out of each core without advancing the chain, whereby the entire chain is returned to a zero position, i.e., each core is returned to the same state indicative of the absence of any information stored in the chain.

The core utilized herein may be a toroid of metallic tape or ferrite which exhibits a substantially rectangular hysteresis loop. Each magnetic core includes the property of existing in first or second remanent states. For convenience, the first state is utilized to represent a binary 1 bit and the second state to represent a binary 0. By applying a magnetomotive force (M.M.F.) of suitable amplitude and polarity to the core, the core can be switched to the opposite state.

FIG. 1.—Circuit

Referring more particularly to FIG. 1, there is illustrated the basic circuit diagram of the novel stepping chain in its simplest form which is capable of only advancing or shifting in a predetermined direction, i.e., from left to right.

The stepping chain includes a plurality of bistable storage elements 10, shown as magnetic cores. Each core is coupled by an active (as opposed to a passive) coupling element 11 to the adjacent right-hand core in the chain. An "active" coupling element as used herein, denotes a circuit including a voltage or current generator, such as a flip-flop transistor, trigger circuit, or blocking oscillator. The purpose of each coupling element is to produce an output pulse in response to a pulse received from a core. This output pulse is supplied to an output terminal and also to the input winding of the next core in the chain for switching the state of the latter.

Each core is provided with an input winding 12, an advance winding 13, an output winding 14 and a premagnetization winding 15. The input winding 12 may be connected to an external pulse source, or may be connected to the output terminals of the preceding left-hand active element 11 through a suitable current limiting and load resistor 16. The advance windings 13 of each of the cores are connected in series between terminal 17 and ground. The output winding 14 is connected to the input of the adjacent right-hand coupling element 11. The premagnetization windings 15 are connected in series between ground and terminal 18.

Where the active coupling element 11 is a monostable circuit such as a blocking oscillator, for example, the element will produce an output pulse and return to its stable state. However, if the coupling element is a bistable device, a resetting pulse must be applied thereto following each advancement of the chain in order to terminate the output pulse and return the element to the initial state thereof. Accordingly, a reset terminal 20 is provided which may be connected to a point in the circuit of a bistable coupling element for resetting the element to its initial state.

Referring briefly to FIG. 2, an idealized plot of B vs. H of a magnetic material is shown and is generally referred to as the hysteresis curve of the material. In the absence of the application of a magnetomotive force (M.M.F.) to a magnetic core, the core exists at either point 22 or point 23 on the curve. When the core is at point 22, it may be arbitrarily stated that the core is storing a binary 0, and when the core is at point 23, it may be said to be storing a binary 1. The core is switched from one state to the other by applying a positive or negative M.M.F. pulse to the core which drives it beyond the knee of the curve. Such pulses generally are referenced to the H axis of FIG. 2. However, in certain instances, a D.C. premagnetization current may be applied to a winding on the core to position the core at point 24, for example, as shown in FIG. 2. The application of a write M.M.F. to a core at state 24, causes the core to be switched to the opposite or binary 1 state. Upon the cessation of the write pulse, the core will revert to point 25. In order to thereafter switch the core to the opposite state (binary 0), a M.M.F. corresponding to the read M.M.F. of FIG. 2 is applied to the core. Upon cessation of the read M.M.F. pulse, the core reverts to point 24.

However, it is to be understood, that the invention disclosed herein may be practiced with or without the premagnetization arrangement described hereinabove with respect to FIGS. 1 and 2, without departing from the scope of the invention.

FIG. 1.—Operation

In order to advance the chain of FIG. 1, advance pulses are applied to terminal 17. As will be seen hereinbelow, each advance pulse is followed by a reset pulse which is applied to terminal 20 prior to the onset of the next advance pulse.

Consider for example, that the magnetic core of stage 1 is in a first remanent state (binary 1). Assume further, that the remaining cores of the chain are each in a second remanent state (binary 0). The application of an advance pulse to terminal 17 attempts to drive the cores into the second remanent state (binary 0) due to the current flowing through each of the windings 13. Since the cores of stages 2–4 are assumed to be in the second remanent state, the state of these cores remains unaltered.

The advance pulse applied to stage 1 drives this core into the second remanent state thereby inducing a pulse in the output winding 14 thereof. This pulse is applied to the coupling element 11 of stage 1 and causes the stable state of the coupling element to be reversed, i.e., the coupling element is turned ON. The fact that the coupling element is turned ON causes a current to flow through input winding 12 of stage 2. This produces an output pulse across resistor 16 which appears at output terminal 19 of stage 1. The current flowing in input winding 12 applies an M.M.F. to the core of stage 2 which drives this core into the first state, thereby storing a representation of a binary 1 in the core. At this point in the operation of the chain, stages 1, 3 and 4 are in the second remanent state and stage 2 is in the first remanent state so that only stage 2 is storing a representation of a binary 1.

Following the advance pulse applied to terminal 17, a reset pulse is applied to terminal 20 whereby any element which was ON is turned OFF. The chain of FIG. 1 is now in a condition to receive another advance pulse which will cause the chain to be advanced one position.

In a similar manner, the application of further advance pulses to the circuit of FIG. 1 causes the position of the chain to be advanced. However, it should be understood that if desired, more than one stage of the chain may initially be in the first state (i.e., ON) so that the application of a stepping pulse will cause the ON positions to be each advanced one stage and the stages which were previously ON to be turned OFF. It is to be understood that while the coupling elements 11 are connected so as to cause the chain to advance from left to right in the drawing, the connections of the coupling elements may be reversed so as to cause the chain to advance from right to left, or additional coupling elements can be provided so that the chain can be advanced in either direction without departing from the scope of the invention. As will be shown hereinbelow, further circuitry may be provided for preventing the chain from advancing during the receipt of an advance pulse.

FIG. 3.—Circuit

Referring more particularly to FIG. 3, another embodiment of the novel control chain is illustrated which is capable of advancing in the forward or reverse direction and of stopping. Besides being able to advance in either direction, the chain may be controlled to remain at a desired point or to start from any position. Furthermore, by arranging the input windings of each of the magnetic cores in various well-known manners, logical operations can be carried out at the input point of each core.

In FIG. 3 the rectangles 30 represent a magnetic core and circuitry for determining the method of operation of each stage. The rectangles 31 represent the input means of each stage and the rectangles 32 represent the output section of each stage.

There are provided a plurality of coupling units 33 each having an input thereof coupled by lead 34 to the output 32 of the associated stage. Each of the coupling elements 33 is also provided with a second input which is connected to reset terminal 35. A first output 36 of each coupling element is connected by lead 37 to the stage associated therewith, by lead 38 to the adjacent right-hand stage and by lead 39 to the adjacent left-hand stage. The output of each stage is taken from the coupling element, each being provided with second and third output terminals 40 and 41. The signal on terminal 41 is the inversion of the signal on terminal 40.

The number of input terminals 42 associated with each stage of the chain depends upon the type of logical function which is to be performed at the input of the stage. The windings of the input section 31 of a stage may be arranged to perform the logical functions, AND, OR, NOT, etc.

There is also provided a control circuit 43 for controlling the forward and reverse advancement and the stoppage of the chain. The control circuit 43 is connected by leads 44, 45 and 46 to each of the stages. When control circuit 43 causes lead 44 to be energized, for example, each stage of the chain is caused to reflect the state of the adjacent left-hand core in a manner similar to that described hereinabove with respect to FIG. 1. When lead 46 is energized by control circuit 43, each stage receives an input from the control element associated with the adjacent right-hand stage. The energization of lead 45 causes each of the stages to remain in their present state, that is, the chain is stopped.

FIG. 4.—Circuit and Operation

FIG. 4 illustrates an example of a circuit diagram for practicing the invention illustrated in FIG. 3. Various idealized waveforms occurring in the circuit of FIG. 4 are illustrated in FIG. 5. Each magnetic core 50 of FIG. 4 is provided with an advance winding 51 which is connected in series with the advance windings of the remaining cores to terminal 52. Advance pulses are applied to terminal 52. Each core is also provided with an input winding 53 and an output winding 54. The dynamic properties of the chain are controlled by the windings 55, 56 and 57 which are operated to respectively cause the chain to advance in a forward direction, to stop, and to advance in the reverse direction.

The logical function at the input of each stage (corresponding to 31 of FIG. 3) is reduced in FIG. 4 to a starting operation for the sake of simplicity. The starting operation in FIG. 4 effects the registration of a binary 1 upon the application of a pulse to winding 53. This is not, strictly speaking, a logical operation. A logical operation would take place if the starting or initial magnetization of a core occurs in coincidence with an excitation effective conjointly for the whole chain. In FIG. 4 such excitation is disregarded.

The active coupling elements of FIG. 4 are synchronized transistor blocking oscillators 58 which produce a pulse of greater duration that the desired output pulse. Each output pulse is terminated by a termination pulse which appears on lead 59 as will be explained hereinbelow. By utilizing a termination pulse, independence from the peculiarities of individual transistors is assured and the duration of each output pulse is thus equal to the time interval between each advance pulse and each terminating pulse.

While the active elements illustrated in FIG. 4 are each blocking oscillators, i.e., monostable elements, bistable elements may be utilized in place thereof as indicated in FIG. 3 without departing from the scope of the invention. The termination pulses appearing on lead 59 of FIG. 4 serve the same function as the reset pulses applied to terminal 35 of FIG. 3, namely, to establish the end of each output pulse.

Each blocking oscillator 58 includes a pulse transformer 60 and an NPN transistor 61. The transistor is coupled between ground and the +10 volt terminal 62 by winding 63. The feedback branch of the oscillator includes the connection from the base of transistor through resistor 64, winding 65, output winding 54 of the associated core and lead 59. Lead 59 is similarly connected to each of the stages of the chain. The output winding 66 of transformer 60 is connected between ground and output terminal 67. Output terminal 67 is also connected through resistor 68 to the anodes of three diodes 69, 70 and 71. The cathode of diode 70 is connected to "stop" winding 56 of the core associated with the blocking oscillator. The cathode of diode 69 is connected to "reverse" winding 57 of the adjacent left-hand stage and the cathode of diode 71 is connected to "forward" winding 55 of the adjacent right-hand stage.

Lead 59 is connected through transistor 74 to the −0.2 volt terminal 75, and is also connected through resistor 76 to the −10 volt terminal 77. Transistor 74 is operated as a switch to control the potential applied to lead 59 which serves as the bias potential of each of the blocking oscillator transistors 61. Transistor 74 is normally ON so that a bias potential of approximately −0.2 volt is applied to each of the blocking oscillators 61 thereby biasing the latter transistors OFF.

When a stage of the chain is switched, for example, so that a binary 1 represented by the state of the core 50 is read out, a pulse is induced in output winding 54. This pulse is applied through winding 65 of transformer 60 and through resistor 64 to the base of the NPN transistor 61 thereby turning the transistor ON. When the blocking oscillator is operative, an output pulse induced in winding 66 which is applied to output terminal 67. The output pulse is also applied to each of the diodes 69, 70 and 71 to control the direction of advance of the chain as will be described more fully hereinbelow.

A termination pulse is applied to terminal 78 at a predetermined time interval following the occurrence of an advance pulse on terminal 52 as shown in the timing chart of FIG. 5. Terminal 78 is coupled through diode 79 in the forward direction to the base of PNP switching transistor 74. The positive direction termination pulse applied to terminal 78 turns transistor 74 OFF and the potential of lead 59 drops to approximately −10 volts. The −10 volt potential is effective to turn OFF each NPN blocking oscillator transistor 61 thereby effecting the termination of the output pulse as illustrated in the timing chart of FIG. 5.

Thus it is seen that when the state of a core 50, which is storing a representation of a binary 1, is reversed a triggering impulse is produced in output winding 54 which turns ON the associated blocking oscillator 58. The blocking oscillator remains operative until it is turned OFF by the termination pulse applied to terminal 78. An output is produced by the blocking oscillator in the time interval between the advance pulse (which causes the state of the core to be reversed) and the succeeding termination pulse.

The blocking oscillator associated with step 1 of the chain includes a diode 80 having the anode thereof connected by a dashed line to winding 65 and the cathode thereof connected by a dashed line to the base of the blocking oscillator transistor. The purpose of the diode is to pass (in the forward direction) the triggering impulse induced in winding 54 when the state of the core is switched. The diode offers the high resistance thereof to the pulse produced by the blocking oscillator when transistor 61 is turned ON. The advantage of isolating the output of the blocking oscillator from the winding 54 of the magnetic core is that the possibility of the pulse produced by the blocking oscillator (and induced in winding 65 of the transformer) again switching the core 50 so as to rewrite a binary 1 therein is eliminated.

The chain of FIG. 4 may be placed in the zero position, i.e., each of the cores storing a representation of a binary 0, by applying a zero-position pulse to terminal 82 which is connected through diode 83 to the base of switching transistor 74. The zero-position pulse must be of sufficient duration so as to overlap an advance pulse which occurs at the same time. When a zero-position pulse is applied to terminal 82 at the time that a stepping pulse is applied to terminal 52, switching transistor 74 is turned OFF thereby applying approximately —10 volts to the base of each of the blocking oscillator transistors 61. Thus each of the blocking oscillator transistors is biased OFF and cannot be turned ON by a triggering pulse induced in winding 54 when the associated core is switched. As a result, the advance pulse applied to terminal 52 causes each of the cores 50, which are in the 1 state to be switched to the zero state and at the same time the zero-position pulse applied to terminal 82 prevents the energization of any of the blocking oscillators. Consequently each of the cores is returned to the state representing a binary 0.

The advance windings 51 of the cores comprising the chain are connected in series between terminal 52 and through switching transistor 85 to ground. The application of an advance pulse to terminal 52 causes a current to flow through each of the advance windings and transistor 85, which is normally ON, to ground. The effect of a particular advance pulse can be eliminated by applying a positive direction "advance-stop" pulse to terminal 86. The duration of the advance-stop pulse must overlap the duration of the advance pulse. The positive direction pulse applied to terminal 86 turns switching transistor 85 OFF thereby interrupting the current path of an advance pulse. Since current cannot flow through windings 51 of the cores when transistor 85 is OFF, an advance pulse is of no effect. The purpose of applying an advance-stop pulse to terminal 86 is to cause the chain to stand still, i.e., no advance in response to the particular advance pulse occurring at that time.

The NPN transistors 90, 91 and 92 are respectively connected between ground and windings 55, 56 and 57 of each of the cores comprising the chain. The purpose of transistor 90 is to permit the chain to be advanced in the forward direction. The purpose of transistor 91 is to permit the chain to be stopped by rewriting in each core the information previously stored therein without advancing the chain. Transistor 92 permits the chain to be advanced in the reverse direction. The transistors 90, 91 and 92 respectively complete the current paths associated with the windings 55, 56 and 57. For example, when transistor 90 is ON, the blocking oscillator pulse appearing at output terminal 67 is applied through resistor 68 and diode 71 to winding 55 of the adjacent right-hand stage and through transistor 90 to ground. Assuming that transistors 91 and 92 are both OFF at this time, current cannot flow through any of the windings 56 and 57 of the cores. Similarly, if transistor 92 is ON and transistors 90 and 91 are OFF, the pulse from the blocking oscillator is applied through diode 69, winding 57 and transistor 92 to ground. The current through winding 57 causes the adjacent left-hand stage of the chain to be switched.

An additional way of stopping the advance of the chain is to cause transistor 91 to be turned ON and transistors 90 and 92 to be turned OFF. Under these circumstances, an output pulse produced by a blocking oscillator, causes current to flow through diode 70, winding 56 of the stage associated with the blocking oscillator and through transistor 91 to ground. This causes the core associated with the blocking oscillator to be switched so that it is once again storing a representation of a binary 1. In other words, an advance pulse causes a stage storing a binary 1 to be switched which produces a triggering pulse that turns ON the associated blocking oscillator. The output pulse of the blocking oscillator is then applied to winding 56 causing the same core to be switched back to the stage representing a binary 1.

The manner in which the advancement of the chain is interrupted by switching transistor 85 (advance-stop) should be contrasted with that provided by transistor 91 (stop). When it is required that advancement be interrupted and that no output pulses be produced at any of the output terminals 67, transistor switch 85 is turned OFF. This inhibits the effect of further advance pulses as long as the transistor remains OFF. Since an advance pulse cannot switch any of the cores, none of the blocking oscillators will be rendered operative to produce output pulses. However, when it is required that advancement of the ring be interrupted and an output pulse is desired at each output terminal corresponding to a core storing a binary 1, switching transistor 91 is turned ON. As stated above, when transistor 91 is ON, each core storing a binary 1 is read out and the associated blocking oscillator is rendered operative to produce a pulse at the proper output terminal and also to cause the core which was switched to be switched again so as to rewite the binary 1 therein. Under this mode of operation, the chain is not advanced but pulses are produced at the output terminals corresponding to the cores which are presently storing binary 1's.

An example of the operation of the circuit of FIG. 4 is illustrated in the timing chart of FIG. 5. At the top of FIG. 5 are shown the advance pulses, the termination pulses and a start pulse. Assume that the start pulse is applied to stage 1 so that the core thereof is switched as indicated in the drawing. The first advance pulse causes the core of stage 1 to be read out which produces a trigger current pulse in the output winding thereof. This pulse energizes the associated blocking oscillator to produce an output pulse as shown. The chain is conditioned to advance in the forward direction and thus the output pulse from stage 1 is applied to stage 2 to cause the core thereof to be switched. Note that the core of stage 1 is returned to its initial state. Core 2 stores a representation of a binary 1 as indicated by the flux waveform until the receipt of the second advance pulse. Similarly, the second advance pulse causes the chain to be stepped an additional step whereby the core of stage 3 represents the storage of a binary 1. The third advance pulse is omitted and thus the chain is indicated as standing still by virtue of the fact that the core of stage 3 continues to store the representation of a binary 1. The remaining advance pulses indicated step the chain additional steps. Note particularly, that the onset of each output pulse coincides with an advance pulse and the trailing edge of the output pulse coincides with a termination pulse. The omission of the third advance pulse is effected by applying an advance-stop pulse to switching transistor 85 of FIG. 4 as described hereinbefore.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A control chain comprising a plurality of bistable magnetic cores, means for performing logical functions at the input of said cores, a plurality of active pulse producing coupling elements intercoupling adjacent ones of said cores each comprising a monostable device for producing an output pulse having a pulse width of predetermined time, and a source of pulses coupled to each of said monostable devices for terminating the output pulse within said predetermined time.

2. Apparatus as claimed in claim 1 wherein each said monostable device comprises a blocking oscillator; each core of said chain including a first output winding, a second winding and a third winding; a feedback circuit associated with said blocking oscillator; means coupling said feedback circuit to said output winding; and means coupling the output of each said blocking oscillator to said second winding of the succeeding core and to said third winding of the preceding core of said chain; and means coupled to each said second and third windings for selectively conditioning one thereof, whereby the operation of a blocking oscillator causes a pulse to be applied to the selected one of the succeeding or preceding core of the chain.

3. Apparatus as claimed in claim 2 wherein each blocking oscillator includes a transformer having a feedback winding connected in series with the output winding of the core associated therewith, and means shunting said feedback winding to permit a pulse produced in said output winding of said core to be applied to said oscillator to trigger the latter.

4. Apparatus as claimed in claim 2 wherein each blocking oscillator includes a transformer having a feedback winding, a unilateral impedance device, and means connecting said impedance in parallel circuit arrangement with the feedback winding of said blocking oscillator and serially connecting the output winding of said core to said parallel circuit arrangement whereby the circuit triggering said oscillator is isolated from the pulse forming circuit of said oscillator.

5. An electrical circuit comprising, a plurality of bistable magnetic cores each having a plurality of windings thereon including an advanced winding, an output winding, and a plurality of input windings; a plurality of active pulse producing coupling elements each associated with a corresponding core; means coupling the output winding of each core to the corresponding element for rendering the latter operative to produce a pulse; means coupling the output of each said element to an input winding of each of the preceding, succeeding and corresponding cores of the chain; switching means coupled to each said element for terminating the operation thereof to establish the trailing edge of each pulse produced thereby; and switching means connected to the input windings of each of said cores for controlling the advance and direction of advance of the chain.

References Cited in the file of this patent

UNITED STATES PATENTS

| | | |
|---|---|---|
| 2,652,501 | Wilson | Sept. 15, 1953 |
| 2,708,722 | An Wang | May 17, 1955 |
| 2,803,812 | Rajchman | Aug. 20, 1957 |
| 2,805,409 | Mader | Sept. 3, 1957 |
| 2,831,150 | Wright et al. | Apr. 15, 1958 |
| 2,852,699 | Ruhman | Sept. 16, 1958 |
| 2,863,138 | Hemphill | Dec. 2, 1958 |
| 2,876,438 | Jones | Mar. 3, 1959 |